Figure 1:
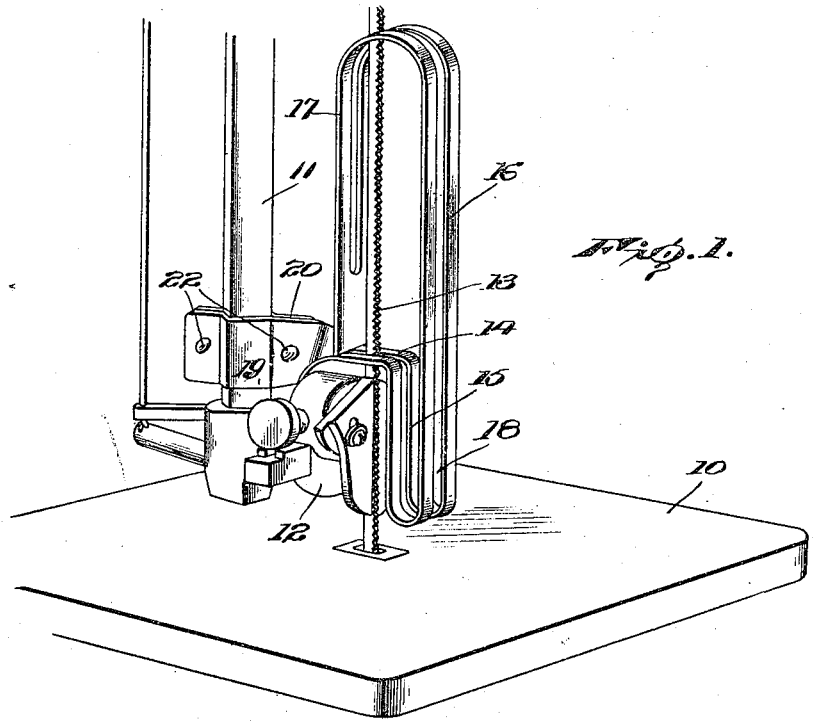

K. H. MILLER & F. A. DUNN.
GUARD FOR BAND SAWS.
APPLICATION FILED APR. 24, 1917.

1,258,695.

Patented Mar. 12, 1918.

Inventors:
K. H. Miller.
F. A. Dunn.

By
Attorneys.

UNITED STATES PATENT OFFICE.

KARL H. MILLER AND FORREST A. DUNN, OF SALINA, KANSAS.

GUARD FOR BAND-SAWS.

1,258,695.  Specification of Letters Patent.  Patented Mar. 12, 1918.

Application filed April 24, 1917. Serial No. 164,130.

*To all whom it may concern:*

Be it known that we, KARL H. MILLER and FORREST A. DUNN, citizens of the United States, residing at Salina, in the county of Saline and State of Kansas, have invented certain new and useful Improvements in Guards for Band-Saws, of which the following is a specification.

This invention relates to an improved guard for band saws and has as its primary object to provide a device of this character which may be readily connected to substantially any conventional type of saw to provide a guard for the saw immediately above the saw table.

The invention has as a further object to provide a guard which will not only stand in front of the saw for a distance above the saw table to prevent the operator from coming in contact with the saw teeth but will also project in the rear of the saw so that the operator cannot accidentally strike the inner edge of the saw.

The invention has as a further object to provide a device of this character which may be formed from a single length of material and will thus be simple in construction and consequently capable of manufacture at minimum cost.

And the invention has as a still further object to provide a guard constructed to form a guard loop slotted to receive the saw so that the device may be readily mounted in place by simply positioning the device to receive the saw through said slot.

Figure 2:
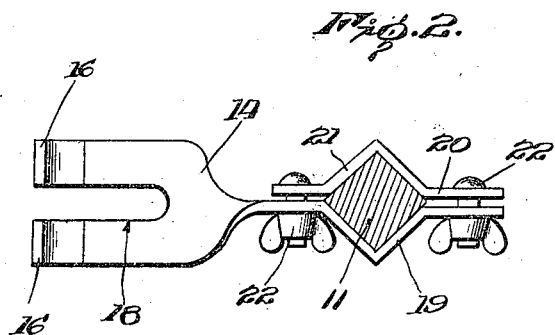

Other and incidental objects will appear as the description proceeds and in the drawings wherein we have illustrated the preferred embodiment of the invention and wherein similar reference characters designate corresponding parts throughout the several views:

Figure 1 is a fragmentary perspective view showing my improved guard applied to a conventional type of band saw, and Fig. 2 is a transverse sectional view more particularly showing the manner in which the device is connected with the saw guide post of the saw.

In order that the construction, mounting, and operation of our improved guard may be accurately understood, we have, in the drawings, shown the device in connection with a conventional type of band saw including a saw table 10. Depending over the saw table is a squared saw guide post 11 upon the lower end of which is adjustably mounted the saw guide 12. Movable in front of the post 11 between the coacting plates of the saw guide is the band saw 13 which is carried through a suitable opening in the table 10. Coming now more particularly to the subject of the present invention, our improved guard is preferably formed from a single strip of suitable resilient sheet metal providing at one extremity a shank 14. From the inner end of the shank, the said strip is bent downwardly at substantially right angles to form a depending arm 15 and is then looped to provide an upstanding front guard member 16. At the upper end of the said guard member, the strip is again looped rearwardly over the inner extremity of the shank 14 to provide a rear guard member 17 extending substantially parallel to the front guard member 16 with the adjacent end of the strip seating against the said shank. It will be observed that the front and rear guard members 16 and 17 are arranged substantially at right angles to the shank 14 and lie in a plane therewith. Formed medially in the strip is a longitudinally extending saw receiving slot 18 which extends from a point adjacent the free extremity of the rear guard member 17 to a point in the shank 14 contiguous to the lower terminal of the said guard member.

The outer extremity of the shank 14 is, as particularly shown in Fig. 2 given a half turn and provided with a rebent portion 19 to seat against the adjacent angularly disposed sides of the guide post 11 of the saw. Coacting with the said shank is an attaching clip 20 also provided with a rebent portion 21 fitting around the other angularly disposed sides of the post 11 opposite to the shank. Removably fitted through the ends of the clip 20 and through the shank are bolts 22 adjustable for clamping the guard upon the saw guide post. Furthermore, this provides an arrangement whereby the guard may be adjusted vertically of the said post.

As will now be observed upon reference to Fig. 1 of the drawings, our improved saw guard is arranged with the shank 14 thereof extending forwardly from the saw guide post 11 above the saw guide 12 with the saw loosely received within the slot 18 of the guard. The shank 14 is of a length to extend outwardly beyond the saw so that the saw is received through the shank and through the uppermost loop of the guard connecting the front and rear guard members 16 and 17. The arm 15 of the guard thus depends in front of the saw with the lowermost loop of the guard supporting the front guard member 16 spaced in advance of the saw. This guard member is thus adapted to prevent accidental contact with the working edge of the saw and will efficiently protect the operator handling the work upon the table 10. At the same time, the uppermost loop of the guard will support the rear guard member 17 in the rear of the saw so that this guard member will prevent accidental contact with the rear edge of the saw above the saw guide. Furthermore, attention is directed to the fact that since the saw 13 is received through the slot 18 in the guard, the guard will project laterally at opposite sides of the plane of the saw to prevent accidental contact with the side faces of the saw. For accommodating work of different thicknesses, the guard may be adjustably elevated with the saw guide post.

It will, therefore, be seen that we provide a particularly efficient construction for the purpose set forth and a device which may be readily attached to substantially any conventional type of band saw. Furthermore, the guard being formed from a single length of material is of simple construction and may thus be manufactured at minimum cost.

Having thus described the invention, what is claimed as new is:

1. A device of the character described including a shank bent at its outer extremity to provide an upstanding front guard member with the said member bent at its upper extremity to provide a rear guard member, the said shank being adapted to support the said members upon opposite sides of a band saw with the saw received through the shank.

2. A device of the character described formed from a slotted length of material bent to provide a shank and then looped from the shank to form an upstanding front guard member, the said length of material being again looped at the upper extremity of the said member to form a rear guard member extending toward the shank with the said shank adapted to support the said guard members upon opposite sides of a band saw received in said slot.

3. A saw guard including a supporting shank provided at its outer extremity with a guard loop having the sides thereof forming front and rear guard members adapted to be supported by the said shank upon opposite sides of a saw received through the shank.

4. A saw guard including a guard loop provided with attaching means and having the sides thereof forming front and rear guard members adapted to extend at opposite sides of a band saw disposed between the said members.

5. A saw guard including a supporting shank provided at its outer extremity with an upstanding guard member arranged in a plane with the shank and adapted to be supported by the shank spaced in front of a band saw received transversely through the body of the shank.

6. A saw guard including a supporting shank provided at its outer extremity with a depending arm having an upstanding guard member extending therefrom and spaced in front of the arm, the said shank being adapted to support the arm and guard member spaced in front of a band saw received transversely through the body of the shank.

7. A device of the character described including a slotted guard loop provided with attaching means and having the sides thereof forming front and rear guard members adapted to extend upon opposite sides of a band saw received through the slot of the loop between the sides thereof.

8. A saw guard formed from a length of material bent to provide a supporting shank and again bent from the said shank to provide a guard loop having the body thereof formed to receive a band saw therethrough.

In testimony whereof we affix our signatures.

KARL H. MILLER. [L. S.]
FORREST A. DUNN. [L. S.]

Copies of this patent may be obtained for five cents each, by addressing the "Commissioner of Patents, Washington, D. C."